United States Patent

Heideman et al.

Patent Number: 6,053,391
Date of Patent: Apr. 25, 2000

[54] FRICTION STIR WELDING TOOL

[75] Inventors: Robert James Heideman, Kewaskum; Jason Winton Thomas Scott, Elkhorn; Christopher Brian Smith, Wauwatosa; Thomas Michael Thessin, Menomonee Falls; Brahmanpalli Narasimhamurthy Ranganathan, Germantown; Donald Frederic Bishofberger, Waukesha, all of Wis.

[73] Assignee: Tower Automotive, Inc., Grand Rapids, Mich.

[21] Appl. No.: 09/078,844

[22] Filed: May 14, 1998

[51] Int. Cl.$^7$ .................................................. B23K 20/12
[52] U.S. Cl. ...................... 228/2.1; 228/112.1; 29/889.21
[58] Field of Search .................................. 228/2.1, 112.1; 29/889.21

[56] References Cited

U.S. PATENT DOCUMENTS

| | | |
|---|---|---|
| 3,580,459 | 5/1971 | Gage et al. . |
| 3,777,658 | 12/1973 | Vosskuhler .............................. 100/98 |
| 4,131,719 | 12/1978 | Nonoyama . |
| 5,460,317 | 10/1995 | Thomas et al. ....................... 228/112.1 |
| 5,469,617 | 11/1995 | Thomas et al. ....................... 29/889.21 |

FOREIGN PATENT DOCUMENTS

| | | | |
|---|---|---|---|
| 0 810 056 A1 | 12/1997 | European Pat. Off. . | |
| 0 888 843 A1 | 1/1999 | European Pat. Off. . | |
| 0602072 B1 | 10/1995 | United Kingdom ................ | 228/112.1 |
| 0615480 | 11/1995 | United Kingdom ................ | 29/889.21 |

OTHER PUBLICATIONS

Article "Production of Wide Aluminum Profiles by Solid–State Friction Stir Welding", by Midling and Johansen, May 1996.

Article"Fiction–Sir Welding Tool With Real–Time Adaptive Control", NASA Tech Briefs, Marshall Space Flight Center, Alabama, Feb. 1997.

Article Friction Stir Process Welds Aluminum Alloys:, Welding Journal, by Dawes and Thomas, Mar. 1996.

Article "Back–Surface Relief to Enhance Friction–Stir Welding", NASA Tech Briefs, Marshall Space Flight Center, Alabama, May 1997.

Article "Friction Stire Welding Shows Great Promise for Joining of DIfficult–to–Weld Materials", Welding Journal, Jun. 1997.

Primary Examiner—Patrick Ryan
Assistant Examiner—Zidia T. Pittman
Attorney, Agent, or Firm—Oppenheimer Wolff & Donnelly; Craig J. Lervick; Daniel G. Chapik

[57] ABSTRACT

A stir weld tool of the present invention is used to weld two pieces of metal together through frictional heating, plasticizing, mixing, and forging of the plasticized metal into a uniform weldment. The stir weld is accomplished by rotating the stir weld tool with a pin having at least one boss on its surface to create the mechanical friction in the metal in contact with the rapidly rotating pin. As the rotating pin travels along the weld joint, the plasticized metal of the work pieces is extruded to the back face of the pin while undergoing a mechanical stirring and forging from action imparted by the at least one boss on the surface of the pin, and while confined from above by the pressure exerted on the metal by a shoulder on the stir weld tool.

10 Claims, 2 Drawing Sheets

FRICTION STIR WELDING TOOL

BACKGROUND OF THE INVENTION

1. Field of the Invention

The present invention relates generally to friction stir welding tools. More particularly, this invention relates to an improved pin profile for a friction stir weld tool tip.

2. Description of Related Art

Friction stir welding ("FSW") is a welding technique that has only recently been developed. This technique was developed primarily for welding metals and alloys that heretofore had been difficult to weld using more traditional fusion techniques. Aluminum and aluminum alloys, in particular, are difficult to weld, requiring weld pool shielding gas and specialized heat sources, and require the oxide layer to be stripped prior to or during the welding process. In addition, aluminum and its alloys are subject to voids and solidification cracking defects when they cool from a liquid. Consequently, in order to manufacture large panels of aluminum and aluminum alloys, extrusion has become the choice of manufacturing. However, even extrusion techniques have size limitations. FSW, as a mechanical stirring technique, is a solid phase welding technique that is a simple and efficient method for obtaining satisfactory welds when using aluminum and its alloys.

Friction stir welding technique uses a rotating shouldered cylindrical tool with a projecting distal pin to create mechanical friction in the metal in contact with the rapidly rotating cylindrical pin tool. This mechanical friction plasticizes the metal. For FSW, the pieces to be welded are clamped to a backing plate with the faying surfaces in close abutment. The pin of the rapidly spinning cylindrical tool is brought into contact with the metal and, for butt joint welding, is centered with the center line of the joint. This contact rapidly creates friction heating, plasticizing the metal, and the pin is slowly plunged into the joint line until the shoulder of cylindrical tool contacts the surface of the metal. At this stage there is a substantial amount of plasticized metal in a column about the rotating pin beneath the shoulder of the cylinder. Parameters for the technique are chosen, such as pin rotation speed, size of the shoulder in relation to the pin diameter, plunging force and rate of translation of the pin, so that a sufficient amount of metal is stirred and the temperature of the metal stays below the metal's melting temperature.

The pin is then moved relative to the work piece along the line of the joint. As the rotating pin moves, the plasticized metal is extruded to the back face of the pin while undergoing a mechanical stirring and forging action imparted by the pin surface profile and confined from above by the pressure exerted on the material by the shoulder of the cylindrical tool. Metal encountering the leading face of the pin is crushed, heated and plasticized only to be extruded to the back face as the pin proceeds down the joint line. Thus, FSW crushes metal along the joint line, breaking up the oxide film, and stirs the plasticized metal on the trailing side of the pin under the shoulder of the cylindrical tool where the metal begins to cool forming a weld. Because the metal is heated to a point below the melting point, this is a solid-phase weld.

Friction stir welding avoids several drawbacks of fusion welding, such as gas metal arc welding. Fusion welding requires that the metal be liquefied forming a weld pool which then cools to a weld bead running the risk of creating voids and cracks. In addition, metal fumes are given off, and in the case of alloys, the metal composition of the weld most likely changes compared to the native alloy because of differential evaporative losses of the alloy constituents. Fusion welding techniques may also lead to segregation of the alloy constituents. In the case of difficult metals such as aluminum, a protective weld gas shield is also required. Friction stir weld does not require the addition of filler or other consumables as some fusion welding techniques do. Additionally, FSW also exhibits superior weld strength and fatigue life compared to gas metal arc welding.

U.S. Pat. No. 5,460,317 titled FRICTION WELDING and issued to Thomas, et al., on Oct. 24, 1995, discloses a method of friction stir welding using a spinning cylindrical tool with pin or an oscillating flattened blade for welding. The pins described are generally smooth except for one embodiment disclosing a pin having a complex surface topography for forming a local plasticized zone in a single locality with the purpose of leaving the plug in place to complete the "spot" weld.

In general, the performance of friction stir welding has exceeded the performance traditionally attributed to more conventional fusion welding techniques. In a paper by Midling, Ole T., and Johansen, Helge G., entitled "Production of Wide Aluminum Profiles by Solid State Friction Stir Welding" as a presentation at the Sixth International Aluminum Technology Seminar and Exposition, pp. 1–10 (Chicago, Ill., May 1996), the authors discuss friction stir welding in comparison with more traditional welding methods. The mechanical properties of the welds are compared for a number of different aluminum alloys demonstrating a superior performance in weld strength for both bending and tension. The authors also note that the profile of the pin surface is important for controlling the degree of mixing and ultimately the strength of the weld. The authors describe a pin profile having two circumferential fins projecting from the center of the pin.

In an article titled "Friction Stir Process Welds Aluminum Alloys" by C. J. Dawes and W. M. Thomas, *Welding Journal*, vol. 75, no. 3, pp. 41–45 (March 1996), the authors discuss friction stir welding trials that had been conducted on various alloys of aluminum, including aluminum and copper, aluminum and magnesium, and aluminum, magnesium and silicon alloys. They were able to demonstrate that friction stir welding can weld metals that otherwise cannot be welded with fusion welding techniques. These welds have high joint strengths and do not suffer from porosity. In addition solid-phase welding enables the retention of the metallurgical properties of the alloys because there is no evaporation of constituent components as would occur in fusion welding. In addition, the authors described the added advantages of welding dissimilar materials and the ability to weld many different component shapes that would normally not be practical or cost effective to either extrude, cast or use fusion welding techniques to manufacture.

Friction stir welding is suitable for use with a number of joint configurations including: square butt, combined butt and lap, single lap, multiple lap, three piece T-butt, two piece T-butt, and edge butt. Of these joints, the square butt, the butt portion of the combined butt and lap, and the three piece T-butt have joint surfaces that are parallel to the axis of the stirring pin. The mixing action is from side to side and top to bottom and will remain fairly uniform and symmetric for as long as the parameters for the welding are kept constant and, for butt joints, if the pin stays on the center line of the joint.

For lap joints, the faying surfaces of the joint are transverse to the axis of the stirring pin and the mixing must be accomplished in the up and down directions. Current FSW practice uses a pin having a surface profile consistent with the thread of a bolt, much like the end of a machine bolt. These pins experience difficulty when attempting to weld a lap joint. The difficulty encountered is interface deformation which is diagrammatically depicted in FIG. 1 by the letter "D". Note that the deformation also is not symmetrical from side to side. With interface deformation, the faying surfaces of the pieces to be welded have been deformed in one direction without fusion occurring between the pieces in this area. This area is also known in the art as a thinning joint. This deformation effectively results in thinning of the affected piece, noted by the letter "T" in the diagram. The thinning substantially weakens the piece, particularly when a pealing shear force is applied to the work piece. Reversing the direction of spin of the stirring pin does not correct this. Instead, the deformation occurs in the opposite direction.

Accordingly, it is an object of the present invention to provide a shouldered cylindrical stirring pin tool that can accomplish adequate friction stir welding for all joint configurations.

It is a further object of the present invention to provide a complex stirring pin profile that is suitable for obtaining adequate friction stir welding for all joint configurations.

SUMMARY OF THE INVENTION

The present invention discloses a stir weld tool suitable for mechanically engaging, frictionally heating and solid-phase welding together, at a joint, at least two metal work pieces. The stir weld tool comprises a cylinder and a distally projecting pin having a complex surface profile. The cylinder is attachable proximally to a motor drive and has a longitudinal axis along with a distal shoulder having a contoured surface generally orthogonal to the longitudinal axis.

The pin is preferably a substantially cylindrical pin projecting from the distal shoulder surface and has a longitudinal axis co-extensive with the cylinder longitudinal axis. Other general shapes are contemplated for the pin in the present invention. Alternative shapes include frusto-conical, inverted frusto-conical, spherical and pear shapes.

The complex surface profile comprises at least one substantially rhomboid shaped boss projecting radially from the surface of the pin. It should be understood that for the purposes of this disclosure, a rhombus is considered a geometrical shape as a subset of the larger set of rhomboid shapes. Preferably, there is a plurality of bosses spaced evenly about the surface of the pin. The boss shape is preferably that of a rhombus, but rhomboid shapes are also anticipated by the present invention, including non-parallelogram rhomboid shapes.

The present invention also anticipates a stir weld tool having a substantially cylindrical pin projecting from the distal shoulder surface having a longitudinal axis co-extensive with the cylinder longitudinal axis and preferably having at least one spiraling first groove and at least one counter-spiraling second groove in the pin surface. The present invention also anticipates using more than one groove spiraling in the same direction. The parallel grooves may be spaced angularly relative to each other around the surface of the pin giving rise to the rhombus and rhomboid boss shapes.

Other objects of the present invention and many of the attendant advantages of the present invention will be readily appreciated as the same become better understood by reference to the following detailed description when considered in connection with the accompanying drawings.

DETAILED DESCRIPTION OF THE INVENTION

Figure 2:
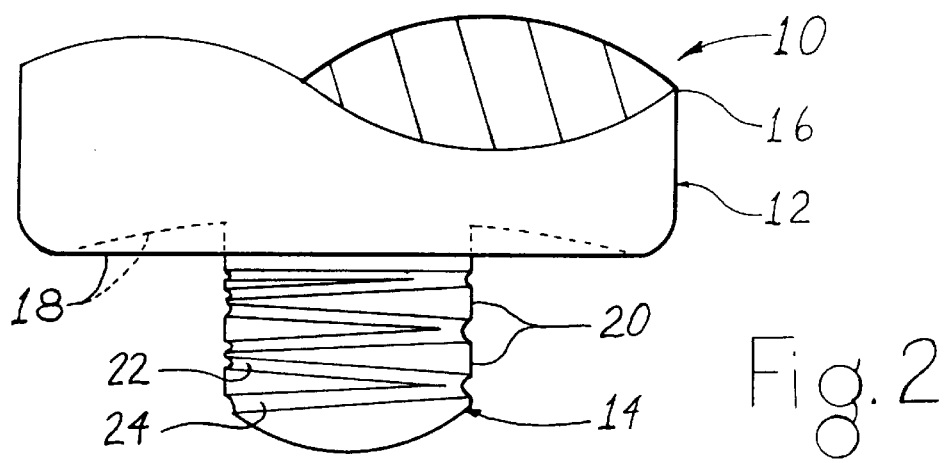
FIG. 2 is a side elevational view of a portion of a shouldered cylindrical stir weld tool with a projecting pin embodiment of the present invention.
Figure 3:
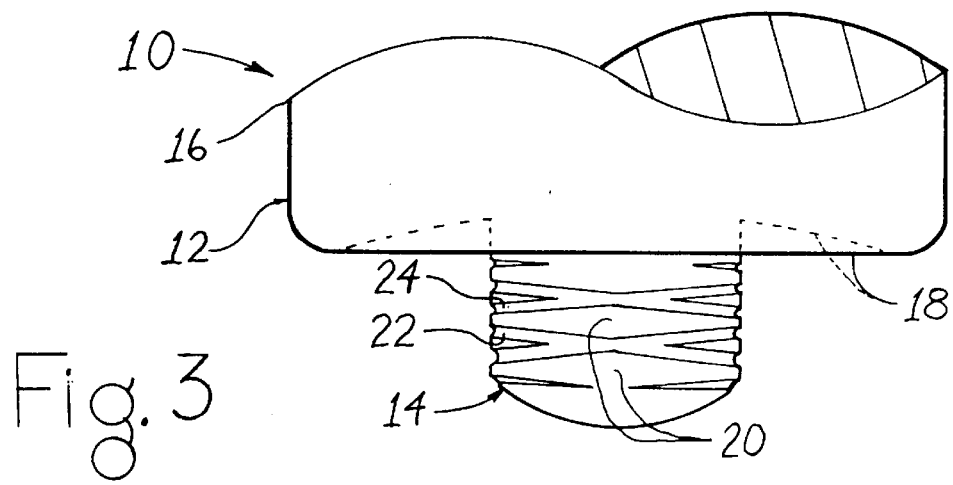
FIG. 3 is a side elevational view of a portion of the shouldered cylindrical stir weld tool depicted in FIG. 2 having been rotated almost 90°.

In reference to FIGS. 2 and 3, there is disclosed a stir weld tool 10 as an embodiment of the present invention. Stir weld tool 10 includes a cylinder 12 and a distally projecting pin 14. Cylinder 12 includes a proximal portion 16 and a distal shoulder 18. Proximal end 16 anticipates the use of attachment mechanisms, not shown, attaching cylinder 12 to any number of appropriate rotary motor drives. Preferably, the drives are mounted on an articulating arm capable of providing a compressive force generally in the axial direction of cylinder 12, as well as, translate cylinder 12 along the line of the joint. Ideally, cylinder 12 is attached proximally to a motor drive portion of a fully automated and fully articulated robotic arm. The motor drive is capable of spinning stir weld tool 10 while the robotic arm translates stir weld tool 10 along the joint to be welded.

The width of cylinder 12 at distal shoulder 18 plays an important role in the friction stir weld process. As discussed and is generally known in the art, the shoulder of a stir weld tool participates in the process in several ways. The more important contributions to the process by the shoulder are to apply a confining pressure to the plasticized material and to maintain an adequate level of heat in the plasticized material providing for sufficient mixing to occur. Additionally, the shoulder confines displaced material to the weld area and smoothes out the surface of the weld, contributing to a favorable cosmetic appearance. As shown in the Figures, the shoulder surface is contoured creating a shallow cavity, as depicted by the phantom lines. In general, the diameter of the shoulder of a cylinder, such as cylinder 12, is one and one half to four times the diameter of the pin.

The cylindrical profile of pin 14 includes a complex profile comprising a plurality of rhombus shaped bosses 20. Each boss, alternatively, may be defined by a spiraling first groove 22 and a counter-spiraling second groove 24. First and second grooves 22, 24 may be die cut into the surface of pin 14 similar to cutting new threads for a screw. Alternatively, the surface of pin 14 may undergo an embossing procedure to place the rhomboid shaped bosses on its surface as part of a die casting process. Alternatively, the rhomboid shaped bossing may also be acquired through forging methods of manufacturing.

The plurality of bosses 20 may be formed by the creation of spiraling grooves, much like threads, with at least one groove spiraling in a first direction and at least one counter-spiraling groove in the opposite direction. As shown in FIGS. 2 and 3, the first and second grooves 22 and 24, respectively, are approximately 180 degrees from each other as measured by the angular difference around the circumference of the pin on a transverse plane placed perpendicular to the longitudinal axis of pin 14. Grooves, or threads, cut in this fashion give rise to substantially uniform rhombus shaped bosses such as those depicted as bosses 20. The pitch chosen for first and second grooves 22, 24 will determine the overall symmetry of rhomboid shaped bosses, such as bosses 20. As shown in FIGS. 2 and 3, the pitch for first and second grooves 22, 24 is fairly flat giving rise to substantially oblate diamond shapes for bosses 20.

Alternative rhomboid shapes are anticipated by the present invention by using first and second grooves counter to each other but less than 180 degrees opposed to each other. Such an arrangement gives rise to large and small rhomboid shaped bosses distributed about the cylinder surface of a pin, such as pin 14. Additionally, the present invention anticipates the use of more than one groove spiraling in a first direction and in combination with one or more counter-spiraling grooves in an opposite second direction. Such an arrangement, using three or more grooves in the surface of the pin provides a number of different rhomboid shapes of the bosses on the surface of the pin. These alternative embodiments are not depicted in the drawings, being considered duplicative while easily understood in reference to the preferred embodiment shown in FIGS. 2 and 3.

The friction stir weld tool of the present invention may be made out of a number of different materials. Choice of a material for a stir weld tool is dependent on the type of metal material to be welded, particularly the melting temperature of the material. An additional consideration is the desired travel speed. Other factors are controlled by the dimension of the tool and depth of the weld required, with the smallest size for a tool being limited by the overall strength of the material of the tool. An exemplary material for use in a stir weld tool is H13 tool steel which is hardened and heat treated.

In operation, stir weld tool 10 is used to weld two pieces of metal together through frictional heating, plasticizing, mixing, and forging of the plasticized metal into a uniform weldment by rotating stir weld tool 10 with pin 14 to create mechanical friction in the metal in contact with the rapidly rotating pin 14. To begin, the work pieces to be welded are clamped to a backing plate with the faying surfaces of the weld joint in close abutment. The joint may be that of a butt joint, lap joint or a combination of lap and butt. If it is a butt joint, the line of the weld joint is the actual junction of the faying surfaces of the work pieces. If it is a lap joint, the line of the weld joint is that line chosen by the operator along which to proceed. The proper length of pin should also be selected. For butt joints, pin 14 should be of sufficient length to nearly equal the total width of the work pieces. For lap joints, pin 14 should be of sufficient length to reach and extend across the lap joint surface.

Pin 14 of the rapidly spinning stir weld tool 10 is brought into to contact with the metal of the work pieces centered with the line of the weld joint. This contact rapidly creates friction heating plasticizing the metal of the work pieces. Pin 14 is slowly plunged into the joint line until shoulder 18 of stir weld tool 10 contacts the surface of the work pieces. At this stage there is a substantial amount of plasticized metal in a column about rotating pin 14 beneath shoulder 18 of stir weld tool 10. Parameters for the technique are chosen, such as pin rotation speed, size of the shoulder in relation to the pin diameter, plunge depth and rate of translation, or travel, of the pin, so that a sufficient amount of metal is plasticized, stirred and forged, with the temperature of work piece metal staying below the metal's melting temperature.

Figure 1:
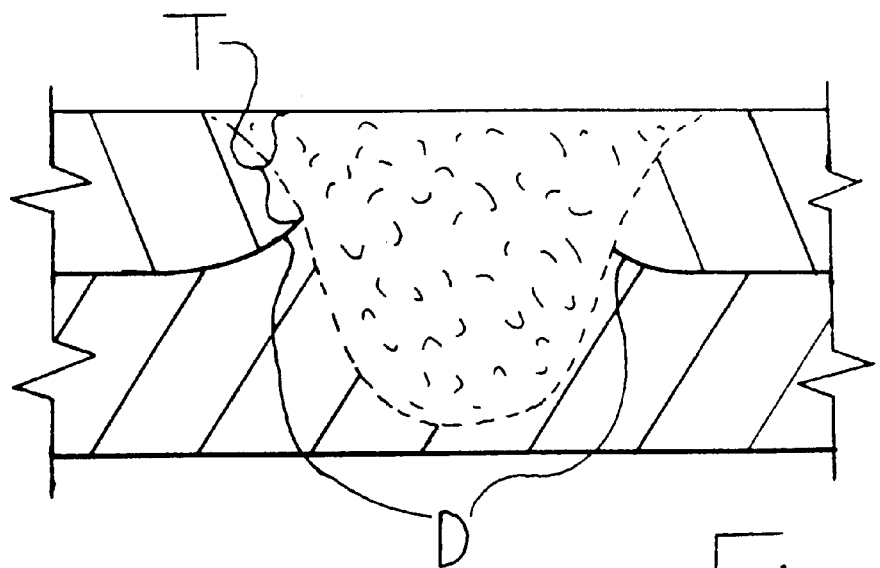
FIG. 1 is a diagrammatic cross-sectional representation of a friction stir weld for a lap joint made with a prior art stir weld tool wherein the stippling represents the area of mixed metal material.
Figure 4:
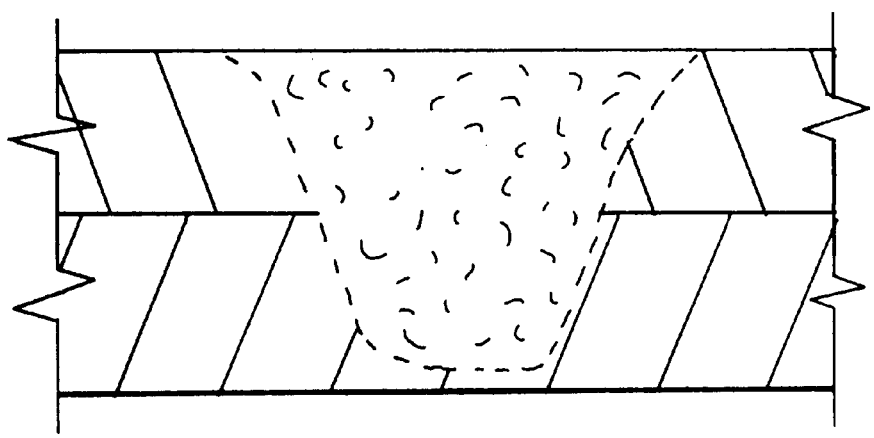
FIG. 4 is a diagrammatic cross-sectional representation of a friction stir weld for a lap joint made with a stir weld tool of the present invention wherein the stippling represents the area of mixed metal material.

Pin 14 is then moved relative to the work pieces along the line of the weld joint while maintaining a downward force on stir weld tool 10 with shoulder 18 in contact with the surface of the work pieces. As rotating pin 14 travels along the weld joint, the plasticized metal of the work pieces is extruded to the back face of pin 14 while undergoing a mechanical stirring and forging from action imparted by bosses 20 on the surface of pin 14, and confined from above by the pressure exerted on the metal by shoulder 18. Metal encountering the leading face of pin 14 is crushed, heated and plasticized, only to be extruded to the back face as pin 14 proceeds down the weld joint line. Bosses 20 contribute to the crushing, heating, stirring and forging action of stir weld tool 10, providing for appropriate stirring and mixing for both the side-to-side mixing, as well as, the up and down mixing. The resultant benefit of the present invention is diagrammatically depicted in FIG. 4, wherein the lap joint is fairly uniform from side to side and up and down with minimal thinning of one or the other work pieces.

The foregoing description is considered as illustrative only of the principles of the invention, and since numerous modifications and changes will readily occur to those skilled in the art, it is not a desire to limit the invention to the exact construction and operation shown and described. Accordingly, all suitable modifications and equivalents may be resorted to, falling within the scope of the present invention.

We claim:

1. A stir weld tool suitable for mechanically engaging, frictionally heating and solid-phase welding together at a joint at least two metal work pieces, the stir weld tool comprising:
   a cylinder, attachable proximally to a motor drive, having a longitudinal axis and a distal shoulder and shoulder surface;
   a substantially cylindrical pin, projecting from the distal shoulder surface, having a longitudinal axis co-extensive with the cylinder longitudinal axis; and
   at least one substantially rhomboid shaped boss projecting radially from the surface of the pin.

2. The stir weld tool of claim 1 in which the at least one boss comprises at least four rhombus shaped bosses uniformly spaced on the pin.

3. A stir weld tool suitable for mechanically engaging, frictionally heating and welding together at a joint at least two metal work pieces, the stir weld tool comprising:
   a cylinder attachable proximally to a motor drive and having a longitudinal axis and a distal shoulder and shoulder surface;
   a substantially cylindrical pin projecting from the distal shoulder surface having a longitudinal axis co-extensive with the cylinder longitudinal axis;
   a spiraling first groove in the pin surface; and
   a counter-spiraling second groove in the pin surface.

4. The stir weld tool of claim 3 wherein the first groove and the second groove are circumferentially displaced 180° relative to each other.

5. The stir weld tool of claim 3 wherein the first groove and the second groove are circumferentially displaced less than 180° relative to each other.

6. The stir weld tool of claim 3 wherein the first groove and the second groove have the same pitch.

7. The stir weld tool of claim 3 wherein the first groove and the second groove have different pitch.

8. A stir weld tool suitable for mechanically engaging, frictionally heating and welding together at a joint at least two metal work pieces, the stir weld tool comprising:

a cylinder attachable proximally to a motor drive and having a longitudinal axis and a distal shoulder and shoulder surface;

a substantially cylindrical pin projecting from the distal shoulder surface having a longitudinal axis co-extensive with the cylinder longitudinal axis;

at least one spiraling groove in the pin surface; and at least one counter-spiraling groove in the pin surface.

9. The stir weld tool of claim 8 wherein the at least one spiraling groove and the at least one counter-spiraling groove have the same pitch.

10. The stir weld tool of claim 8 wherein the at least one spiraling groove and the at least one counter-spiraling groove have different pitch.

* * * * *